(12) United States Patent
Walker et al.

(10) Patent No.: US 7,673,928 B2
(45) Date of Patent: Mar. 9, 2010

(54) TAILGATE SPOILER WITH INTEGRATED ROTATING HINGE COVER

(75) Inventors: Christopher Walker, Hillsborough, NC (US); Akihiko Kuribayashi, Dublin, OH (US); Takuji Ohara, Dublin, OH (US); Ryo Inoue, Dublin, OH (US); Bob Tamarapoo, Powell, OH (US); Joshua Morrow, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 12/062,033

(22) Filed: Apr. 3, 2008

(65) Prior Publication Data

US 2009/0167053 A1 Jul. 2, 2009

Related U.S. Application Data

(60) Provisional application No. 61/016,934, filed on Dec. 27, 2007.

(51) Int. Cl.
*B60J 5/10* (2006.01)

(52) U.S. Cl. .............................. 296/146.11; 296/146.8; 296/180.3

(58) Field of Classification Search .............. 296/146.8, 296/146.11, 146.12, 146.15, 146.16, 180.3, 296/180.5; 49/339, 340
See application file for complete search history.

(56) References Cited

U.S. PATENT DOCUMENTS

| | | | |
|---|---|---|---|
| 3,647,257 A * | 3/1972 | Litchfield | 296/91 |
| 4,664,437 A | 5/1987 | Queveau | |
| 5,072,984 A | 12/1991 | Jackson | |
| 5,095,582 A | 3/1992 | Ohlsson | |
| 5,876,086 A | 3/1999 | Lagrou et al. | |
| 6,000,747 A * | 12/1999 | Sehgal et al. | 296/146.8 |
| 6,203,094 B1 | 3/2001 | Lee | |
| 6,234,564 B1 | 5/2001 | Kim | |
| 6,607,231 B2 | 8/2003 | Paiva et al. | |
| 6,637,806 B2 | 10/2003 | Kazama | |
| 6,659,538 B2 | 12/2003 | Scheid | |
| 6,733,063 B2 | 5/2004 | Paiva et al. | |
| 6,783,172 B2 | 8/2004 | De Gaillard | |
| 6,805,398 B2 | 10/2004 | Harima et al. | |
| 6,824,196 B2 | 11/2004 | Neidlein | |
| 6,860,537 B2 | 3/2005 | Seksaria et al. | |
| 7,011,357 B2 | 3/2006 | Seksaria et al. | |
| 7,021,698 B2 | 4/2006 | Yamada et al. | |
| 2003/0214148 A1 | 11/2003 | Neidlein | |
| 2006/0279105 A1 | 12/2006 | Renke et al. | |

* cited by examiner

*Primary Examiner*—Glenn Dayoan
*Assistant Examiner*—Melissa A Black
(74) *Attorney, Agent, or Firm*—Mark E. Duell, Esq.; Emerson, Thomson & Bennett

(57) ABSTRACT

An integrated rear spoiler and hinge cover that covers a flip-glass window hinge that is not attached to the flip glass window hinge and rotates from a fully closed position to a fully open position substantially simultaneously with the flip-glass window hinge.

15 Claims, 14 Drawing Sheets

TAILGATE SPOILER WITH INTEGRATED ROTATING HINGE COVER

This application claims priority to U.S. Ser. No. 61/016,934 entitled TAILGATE SPOILER WITH INTEGRATED ROTATING HINGE COVER, filed Dec. 27, 2007, which is incorporated herein by reference.

I. BACKGROUND OF THE INVENTION

A. Field of Invention

This invention pertains to the art of methods and apparatuses regarding the manufacture and assembly of vehicle tailgate spoiler structures, and more specifically to the art of methods and apparatuses regarding the manufacture and assembly of vehicle tailgate spoiler structures having integrated hinge cover apparatuses.

B. Description of the Related Art

It is known to provide a vehicle with a wind-deflector or spoiler located on the tailgate or rear-facing side of the vehicle. During operation of the vehicle, the rear spoiler may control airflow for purposes such as reducing lift acting on the rear of the vehicle. The rear spoiler may also or alternatively function as a vehicle garnish or decorative device. Commonly, the rear spoiler is adjacent to a flip glass window also located on the tailgate or rear-facing side of the vehicle. The flip-glass window may be pivotally coupled to the tailgate by flip-glass hinges. The flip-glass hinges may have an interior portion that attaches or couples to the inner surface of the flip-glass window and an attachment portion that attaches or couples the flip-glass hinge to the outer surface of the vehicle tailgate.

It is also know to use the rear spoiler to conceal or hide the attachment portion of the flip-glass hinge. Conventionally, the rear spoiler has two cut out portions that surround the exposed portions of each flip-glass hinge. A hinge cover piece is then attached to the exposed portion of the flip-glass hinge. The hinge cover piece is colored and textured to match the outer surface of the rear spoiler. Alternatively, no attempt is made to conceal the exposed portions of the flip-glass hinge, and the rear spoiler is simply positioned above the exposed portions of the flip-glass hinge.

Although known spoiler/flip-glass hinge assemblies work well for their intended purposes, several disadvantages exist. Use of a hinge cover piece attached to the exposed portion of the flip-glass hinge requires that a large gap be placed between the rear spoiler and the hinge cover piece. This large gap is necessary to provide the appropriate clearance required so that the hinge cover piece does not contact the rear spoiler when the flip-glass window is being opened or closed. Additionally, the large gap is necessary to compensate for expansion and contraction of the rear spoiler and the hinge cover piece resulting from changes in the ambient temperature. The large gap is undesirable as it reduces the aesthetic appearance of the vehicle which may result in decreased sales and profits.

II. SUMMARY OF THE INVENTION

According to one embodiment of the invention, a vehicle rear-facing side comprises a rear-facing side body, a flip-glass window, and a rear spoiler assembly. The flip-glass window is pivotally coupled to the rear-facing side body via a flip-glass window hinge thereby creating a flip-glass axis such that the flip-glass window can rotate between a fully closed position and a fully open position along the flip-glass axis. The rear spoiler assembly comprises a main body portion coupled to the rear-facing side, and a hinge cover portion. The main body portion comprises a hinge cover recess that is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position.

According to one embodiment of the invention, a vehicle comprises a rear-facing side, a flip-glass window, and a rear spoiler assembly. The flip-glass window is pivotally coupled to the rear-facing side via a flip-glass window hinge thereby creating a flip-glass axis such that the flip-glass window can rotate between a fully closed position and a fully open position along the flip-glass axis. The rear spoiler assembly comprises a main body portion coupled to the rear-facing side, and a hinge cover portion. The main body portion comprises a hinge cover recess that is defined by a first recess wall, a second recess wall, and a third recess wall. The hinge cover portion comprises a hinge cover, a goose neck tab, a first cover tab, a second cover tab, a cover spring, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position. The cover spring is coupled to the hinge cover pin and urges the hinge cover towards the fully closed position.

According to one embodiment of the invention, a vehicle comprises a rear-facing side, a flip-glass window, and a rear spoiler assembly. The flip-glass window is pivotally coupled to the rear-facing side via a flip-glass window hinge thereby creating a flip-glass axis such that the flip-glass window can rotate between a fully closed position and a fully open position along the flip-glass axis. The rear spoiler assembly comprises a main body portion coupled to the rear-facing side, and a hinge cover portion. The main body portion comprises a hinge cover recess that is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simulta-neously rotate from the fully closed position to the fully open position. The flip-glass window rotates a first angular distance between the fully closed position and the fully open position. The flip-glass window rotates a second angular distance between the fully closed position and an H-position. The second angular distance is equal to about one half of the first angular distance and the hinge cover axis is located along a first reference line that extends through the flip-glass axis and the H-position.

According to one embodiment of the invention, a vehicle comprises a rear-facing side, a flip-glass window, and a rear spoiler assembly. The flip-glass window is pivotally coupled to the rear-facing side via a flip-glass window hinge thereby creating a flip-glass axis such that the flip-glass window can rotate between a fully closed position and a fully open position along the flip-glass axis. The rear spoiler assembly comprises a main body portion coupled to the rear-facing side, and a hinge cover portion. The main body portion comprises a hinge cover recess that is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position. The flip-glass window rotates a first angular distance between the fully closed position and the fully open position. The flip-glass window rotates a second angular distance between the fully closed position and an H-position. The second angular distance is equal to about one half of the first angular distance and the hinge cover axis is located below a first reference line that extends through the flip-glass axis and the H-position.

According to one embodiment of the invention, a vehicle rear-facing side comprises a rear-facing side body, a flip-glass window, and a rear spoiler assembly. The flip-glass window is pivotally coupled to the rear-facing side body via a flip-glass window hinge thereby creating a flip-glass axis such that the flip-glass window can rotate between a fully closed position and a fully open position along the flip-glass axis. The flip-glass window hinge comprises a first hinge leaf, a second hinge leaf, and a flip-glass hinge pin. The first hinge leaf is coupled to an inner surface of the flip-glass window. The second hinge leaf is coupled an outer surface of the rear-facing side body. The hinge cover substantially covers the second hinge leaf and the flip-glass hinge pin. The rear spoiler assembly comprises a main body portion coupled to the rear-facing side, and a hinge cover portion. The main body portion comprises a hinge cover recess that is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position.

According to one embodiment of the invention, a vehicle rear-facing side comprises a rear-facing side body, a flip-glass window, and a rear spoiler assembly. The flip-glass window is pivotally coupled to the rear-facing side body via a flip-glass window hinge thereby creating a flip-glass axis such that the flip-glass window can rotate between a fully closed position and a fully open position along the flip-glass axis. The flip-glass window hinge comprises a first hinge leaf, a second hinge leaf, and a flip-glass hinge pin. The first hinge leaf is coupled to an inner surface of the flip-glass window. The second hinge leaf is coupled an outer surface of the rear-facing side body. The hinge cover substantially covers the second hinge leaf, the flip-glass hinge pin, and at least a portion of the first hinge leaf. The rear spoiler assembly comprises a main body portion coupled to the rear-facing side, and a hinge cover portion. The main body portion comprises a hinge cover recess that is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position.

According to one embodiment of the invention, a vehicle comprises a vehicle rear-facing side, a vehicle rear-facing side, a flip-glass window, and a rear spoiler assembly. The flip-glass window is pivotally coupled to the vehicle rear-facing side via a flip-glass window hinge thereby creating a flip-glass axis, such that the flip-glass window can rotate between a fully closed position and a fully opened position along the flip-glass axis. The rear spoiler assembly is coupled to the vehicle rear-facing side and comprises a main body portion and a hinge cover portion. The main body portion comprises a hinge cover recess, wherein the hinge cover recess is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position.

According to one embodiment of the invention, a vehicle comprises a vehicle rear-facing side, a vehicle rear-facing side, a flip-glass window, and a rear spoiler assembly. The flip-glass window is pivotally coupled to the vehicle rear-facing side via a flip-glass window hinge thereby creating a flip-glass axis, such that the flip-glass window can rotate between a fully closed position and a fully opened position along the flip-glass axis. The rear spoiler assembly is coupled to the vehicle rear-facing side and comprises a main body portion and a hinge cover portion. The main body portion comprises a hinge cover recess, wherein the hinge cover recess is defined by a first recess wall, a second recess wall, and a third recess wall. The hinge cover portion comprises a hinge cover, a goose neck tab, a first cover tab, a second cover tab, a cover spring, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position. The cover spring is coupled to the hinge cover pin and urges the hinge cover towards the fully closed position.

According to one embodiment of the invention, a vehicle comprises a vehicle rear-facing side, a vehicle rear-facing side, a flip-glass window, and a rear spoiler assembly. The flip-glass window is pivotally coupled to the vehicle rear-facing side via a flip-glass window hinge thereby creating a flip-glass axis, such that the flip-glass window can rotate between a fully closed position and a fully opened position along the flip-glass axis. The rear spoiler assembly is coupled to the vehicle rear-facing side and comprises a main body portion and a hinge cover portion. The main body portion comprises a hinge cover recess, wherein the hinge cover recess is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position. The flip-glass window rotates a first angular distance between the fully closed position and the fully open position. The flip-glass window rotates a second angular distance between the fully closed position and a H-position. The second angular distance is equal to about one half of the first angular distance. The hinge cover is located along a first reference line that extends through the flip-glass hinge axis and the H-position. The hinge cover axis and the flip-cover axis are separated along the first reference line by a first distance.

According to one embodiment of the invention, a vehicle comprises a vehicle rear-facing side, a vehicle rear-facing side, a flip-glass window, and a rear spoiler assembly. The flip-glass window is pivotally coupled to the vehicle rear-facing side via a flip-glass window hinge thereby creating a flip-glass axis, such that the flip-glass window can rotate between a fully closed position and a fully opened position along the flip-glass axis. The rear spoiler assembly is coupled to the vehicle rear-facing side and comprises a main body portion and a hinge cover portion. The main body portion comprises a hinge cover recess, wherein the hinge cover recess is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position. The flip-glass window rotates a first angular distance between the fully closed position and the fully open position. The flip-glass window rotates a second angular distance between the fully closed position and a H-position. The second angular distance is equal to about one half of the first angular distance. The hinge cover axis is located below a first reference line that extends through the flip-glass hinge axis and the H-position.

According to one embodiment of the invention, a vehicle comprises a vehicle rear-facing side, a vehicle rear-facing side, a flip-glass window, and a rear spoiler assembly. The flip-glass window is pivotally coupled to the vehicle rear-facing side via a flip-glass window hinge thereby creating a flip-glass axis, such that the flip-glass window can rotate between a fully closed position and a fully opened position along the flip-glass axis. The flip-glass window hinge comprises a first hinge leaf, a second hinge leaf, and a flip-glass hinge pin. The first hinge leaf is coupled to an inner surface of the flip-glass window. The second hinge leaf is coupled to an outer surface of the rear-facing side. The hinge cover substantially covers the second hinge leaf and the flip-glass hinge pin. The rear spoiler assembly is coupled to the vehicle rear-facing side and comprises a main body portion and a hinge cover portion. The main body portion comprises a hinge cover recess, wherein the hinge cover recess is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position.

According to one embodiment of the invention, a vehicle comprises a vehicle rear-facing side, a vehicle rear-facing side, a flip-glass window, and a rear spoiler assembly. The flip-glass window is pivotally coupled to the vehicle rear-facing side via a flip-glass window hinge thereby creating a flip-glass axis, such that the flip-glass window can rotate between a fully closed position and a fully opened position along the flip-glass axis. The flip-glass window hinge comprises a first hinge leaf, a second hinge leaf, and a flip-glass hinge pin. The first hinge leaf is coupled to an inner surface of the flip-glass window. The second hinge leaf is coupled to an outer surface of the vehicle rear-facing side. The hinge cover substantially covers the second hinge leaf, at least a portion of the first hinge leaf, and the flip-glass hinge pin. The rear spoiler assembly is coupled to the vehicle rear-facing side and comprises a main body portion and a hinge cover portion. The main body portion comprises a hinge cover recess, wherein the hinge cover recess is defined by a first recess wall, a second recess wall, and a third recess wall. The hinge cover portion comprises a hinge cover, a goose neck tab, a first cover tab, a second cover tab, and a hinge cover pin. The goose neck tab is coupled to the hinge cover. The first cover tab is coupled to the first recess wall. The second cover tab is coupled to the third recess wall. The first recess wall is substantially directly opposite of the third recess wall. The hinge cover pin pivotally couples the hinge cover portion to the main body portion thereby creating a hinge cover axis such that the hinge cover can rotate between a fully closed position and a fully open position about the hinge cover axis. The rotation of the flip-glass window from the fully closed position to the fully open position causes the hinge cover to substantially simultaneously rotate from the fully closed position to the fully open position.

According to one embodiment of the invention, a method comprises the steps of: (a) providing a vehicle comprising a vehicle rear-facing side; a flip-glass window that is pivotally coupled to the vehicle rear-facing side via a flip-glass window hinge thereby creating a flip-glass axis, such that the flip glass window can rotate between a fully closed position and a fully opened position along the flip-glass axis wherein an H-position is located substantially about one half of the angular distance between the fully closed position and the fully open position; a vehicle air deflector assembly coupled to the vehicle rear-facing side comprising: a main body portion comprising a hinge cover recess, wherein the hinge cover recess is defined by a first recess wall, a second recess wall, and a third recess wall; a hinge cover portion comprising: a hinge cover; a goose neck tab coupled to the hinge cover; a first and a second cover tab, wherein the first cover tab is coupled to the first recess wall and the second cover tab is coupled to the third recess wall and the first recess wall is substantially directly opposite of the third recess wall; and, a hinge cover pin, wherein the hinge cover pin pivotally couples the hinge cover portion to the main body portion thereby creating a hinge cover axis such that the hinge cover can rotate between a fully closed position and a fully open position about the hinge cover axis; wherein rotation of the flip-glass window from the fully closed position to the fully open position causes the hinge cover to substantially simultaneously rotate from the fully closed position to the fully open position; and, (b) rotating the flip-glass window from the fully closed position to the fully open position, wherein the rotation of the flip-glass window from the fully closed position to the fully open position at least partially causes the integrated hinge cover to rotate from a flush position to an open position.

According to one embodiment of the invention, a method comprises the steps of: (a) providing a vehicle comprising a vehicle rear-facing side; a flip-glass window that is pivotally coupled to the vehicle rear-facing side via a flip-glass window hinge thereby creating a flip-glass axis, such that the flip glass window can rotate between a fully closed position and a fully opened position along the flip-glass axis wherein an H-position is located substantially about one half of the angular distance between the fully closed position and the fully open position; a vehicle air deflector assembly coupled to the vehicle rear-facing side comprising: a main body portion comprising a hinge cover recess, wherein the hinge cover recess is defined by a first recess wall, a second recess wall, and a third recess wall; a hinge cover portion comprising: a hinge cover; a goose neck tab coupled to the hinge cover; a first and a second cover tab, wherein the first cover tab is coupled to the first recess wall and the second cover tab is coupled to the third recess wall and the first recess wall is substantially directly opposite of the third recess wall; and, a hinge cover pin, wherein the hinge cover pin pivotally couples the hinge cover portion to the main body portion thereby creating a hinge cover axis such that the hinge cover can rotate between a fully closed position and a fully open position about the hinge cover axis; wherein rotation of the flip-glass window from the fully closed position to the fully open position causes the hinge cover to substantially simultaneously rotate from the fully closed position to the fully open position; positioning the hinge cover axis substantially along a first reference line wherein the first reference line extends through the H-position and the flip-glass axis, wherein the hinge cover axis and the flip-glass axis are separated by a first distance; and, (b) rotating the flip-glass window from the fully closed position to the fully open position, wherein the rotation of the flip-glass window from the fully closed position to the fully open position at least partially causes the integrated hinge cover to rotate from a flush position to an open position.

According to one embodiment of the invention, a method comprises the steps of: (a) providing a vehicle comprising a vehicle rear-facing side; a flip-glass window that is pivotally coupled to the vehicle rear-facing side via a flip-glass window hinge thereby creating a flip-glass axis, such that the flip glass window can rotate between a fully closed position and a fully opened position along the flip-glass axis wherein an H-position is located substantially about one half of the angular distance between the fully closed position and the fully open position; a vehicle air deflector assembly coupled to the vehicle rear-facing side comprising: a main body portion comprising a hinge cover recess, wherein the hinge cover recess is defined by a first recess wall, a second recess wall, and a third recess wall; a hinge cover portion comprising: a hinge cover; a goose neck tab coupled to the hinge cover; a first and a second cover tab, wherein the first cover tab is coupled to the first recess wall and the second cover tab is coupled to the third recess wall and the first recess wall is substantially directly opposite of the third recess wall; and, a hinge cover pin, wherein the hinge cover pin pivotally couples the hinge cover portion to the main body portion thereby creating a hinge cover axis such that the hinge cover can rotate between a fully closed position and a fully open position about the hinge cover axis; wherein rotation of the flip-glass window from the fully closed position to the fully open position causes the hinge cover to substantially simultaneously rotate from the fully closed position to the fully open position; positioning the hinge cover axis substantially below a first reference line, wherein the first reference line extends through the H-position and the flip-glass axis; and, (b) rotating the flip-glass window from the fully closed position to the fully open position, wherein the rotation of the flip-glass window from the fully closed position to the fully open position at least partially causes the integrated hinge cover to rotate from a flush position to an open position.

One advantage of this invention is that the gap between the hinge cover piece and the rear spoiler is reduced thereby increasing the aesthetic appearance of the vehicle which may result in increased sales and profits.

Another advantage of this invention is that the surface flushness between the spoiler main body and the hinge cover outer surface can be controlled.

Another advantage of this invention is that the installation of the rear spoiler assembly is simplified due to the hinge cover portions being integrated with the rear spoiler assembly.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 4b is a side view of the flip-glass receiving portion of the hinge portion shown in FIG. 4a.

FIG. 4c is a top view of the hinge mounting portion of the hinge portion shown in FIG. 4a.

FIG. 4d is a rear view of the hinge portion and hinge pin shown in FIG. 4a.

FIG. 7b is a perspective bottom view of the hinge cover portion shown in FIG. 7a.

IV. DETAILED DESCRIPTION OF THE INVENTION

Figure 1:
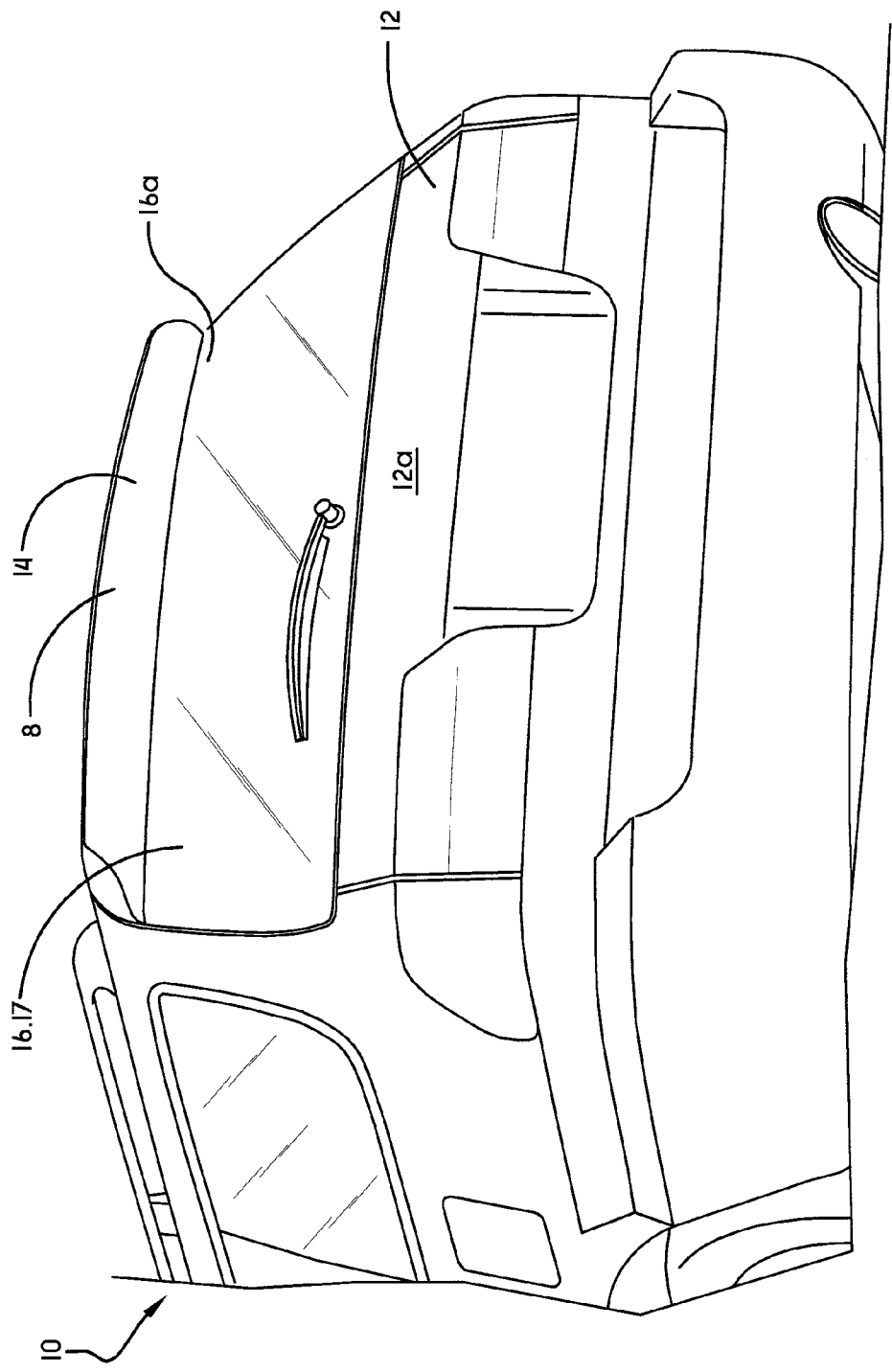
FIG. 1 is a perspective back view of a vehicle having a rear spoiler assembly and a flip-glass window in the fully closed position according to one embodiment of the invention.
Figure 2:
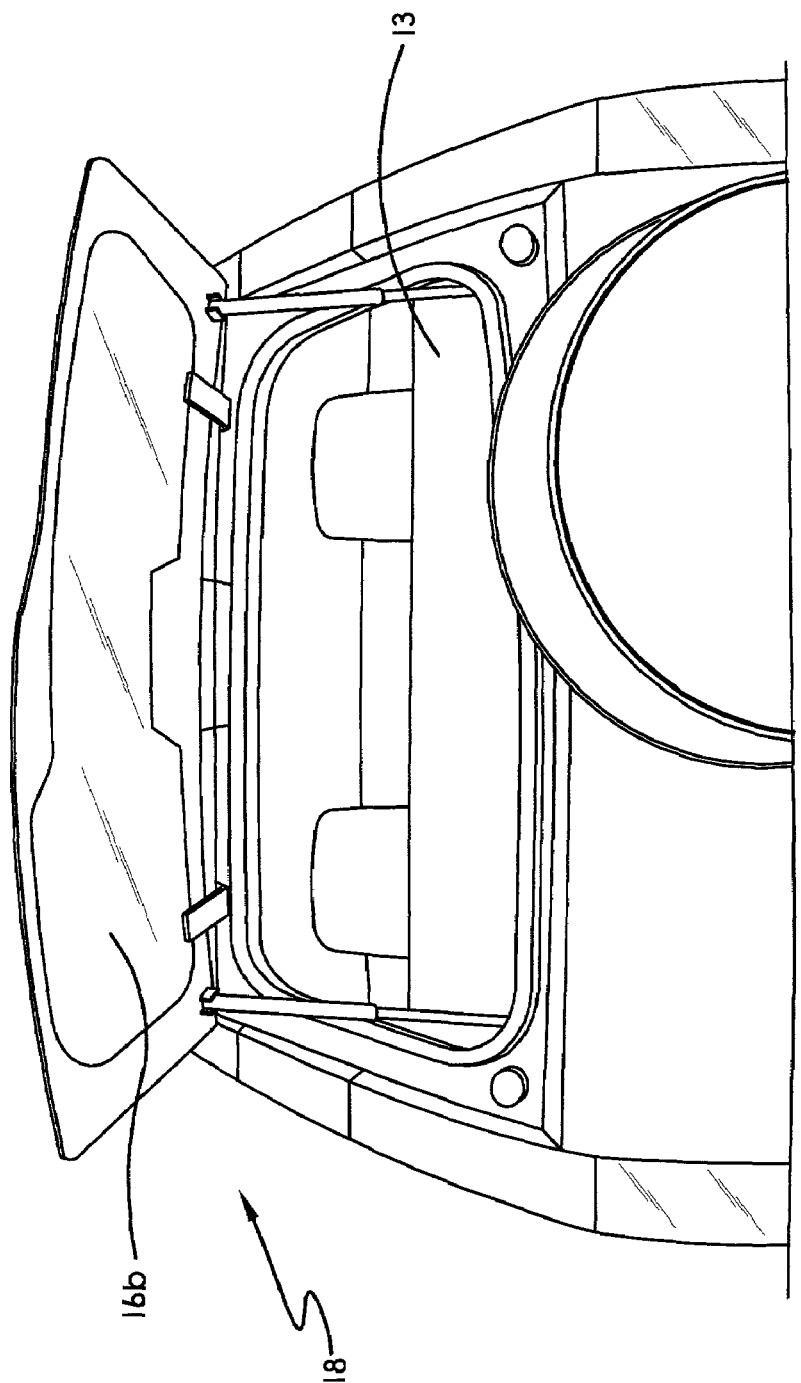
FIG. 2 is a back view of the vehicle of FIG. 1 with the flip-glass window in the fully open position according to one embodiment of the invention.

Referring now to the drawings wherein the showings are for purposes of illustrating embodiments of the invention only and not for purposes of limiting the same, FIG. 1 shows a vehicle 10 comprising a vehicle tailgate 12. The vehicle tailgate 12 may be pivotally connected to the vehicle 10 and may comprise a rear spoiler assembly 14 and a flip-glass window 16 that substantially encloses a rear window opening 13 (as shown in FIG. 2). The rear window opening 13 may be integrally formed within the vehicle tailgate 12 to provide a rear view. The rear spoiler assembly 14 may be located adjacent to the flip-glass window 16 and may form a protrusion projecting outwardly and extending widthwise across the vehicle tailgate 12 along an upper edge 16a of the flip-glass window 16. The rear spoiler assembly 14 may control airflow for purposes such as reducing lift acting on the rear of the vehicle 10. Other embodiments of the invention include the rear spoiler assembly 14 comprising a vehicle garnish structure for improving the aesthetic appearance of the vehicle 10. The vehicle tailgate 12 may comprise any rear-facing side of a vehicle comprising a flip-glass window and a rear spoiler assembly chosen with sound judgment and is not intended as a limitation of the present invention.

Figure 3:
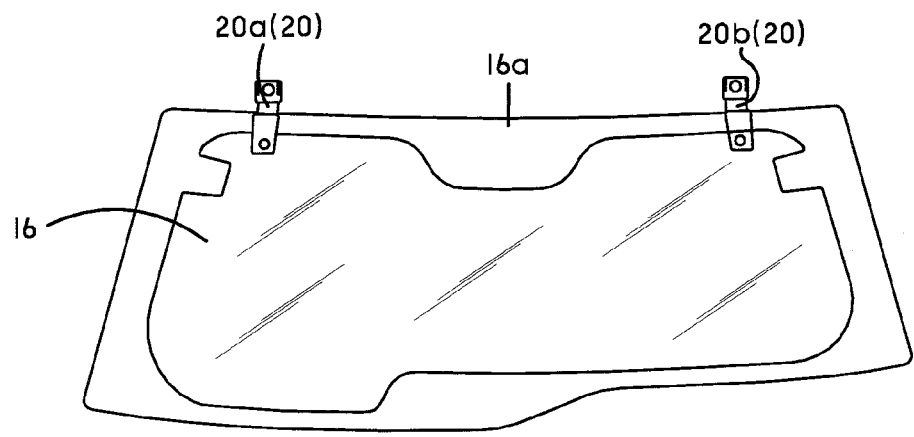
FIG. 3 is a partial back view of a flip-glass window and a pair of hinge portions according to one embodiment of the invention.

With reference now to FIGS. 1-3, the flip-glass window 16 may be pivotally coupled to the vehicle tailgate 12. In one embodiment, the flip-glass window 16 may be pivotally coupled to the vehicle tailgate 12 to move between a fully closed position 17 (as shown in FIG. 1) to a fully open position 18 (as shown in FIG. 2). The flip-glass window 16 may be pivotally connected to the vehicle tailgate 12 by a flip-glass hinge assembly 20. In one embodiment, the flip-glass hinge assembly 20 may comprise a first hinge portion 20a and a second hinge portion 20b. The hinge assembly 20 may comprise any number of hinge portions chosen with sound judgment by a person of skill in the art. The first and second hinge portions 20a, 20b may be substantially similar to each other and for the sake of clarity only one will be described.

With reference now to FIGS. 1 and 3, the first and second hinge portions 20a, 20b may comprise a first hinge leaf 24, a hinge mounting portion 25, and a flip-glass hinge pin 26. The flip-glass hinge pin 26 may pivotally couple the first hinge leaf 24 and the hinge mounting portion 25 such that the first hinge leaf 24 and the hinge mounting portion 25 may rotate about a flip-glass hinge axis 27 relative to each other. In one embodiment, the flip-glass hinge axis 27 may be substantially co-linear with the central axis 26a of the flip-glass hinge pin 26. The hinge mounting portion 25 may be coupled to the outer surface 12a of the vehicle tailgate 12. In one embodiment, the hinge mounting portion 25 may be coupled to the tailgate body 12a by a conventional fastener such as a bolt or screw. The hinge mounting portion 25 may be coupled to the tailgate body 12a utilizing any method chosen with sound engineering judgment.

Figure 9:
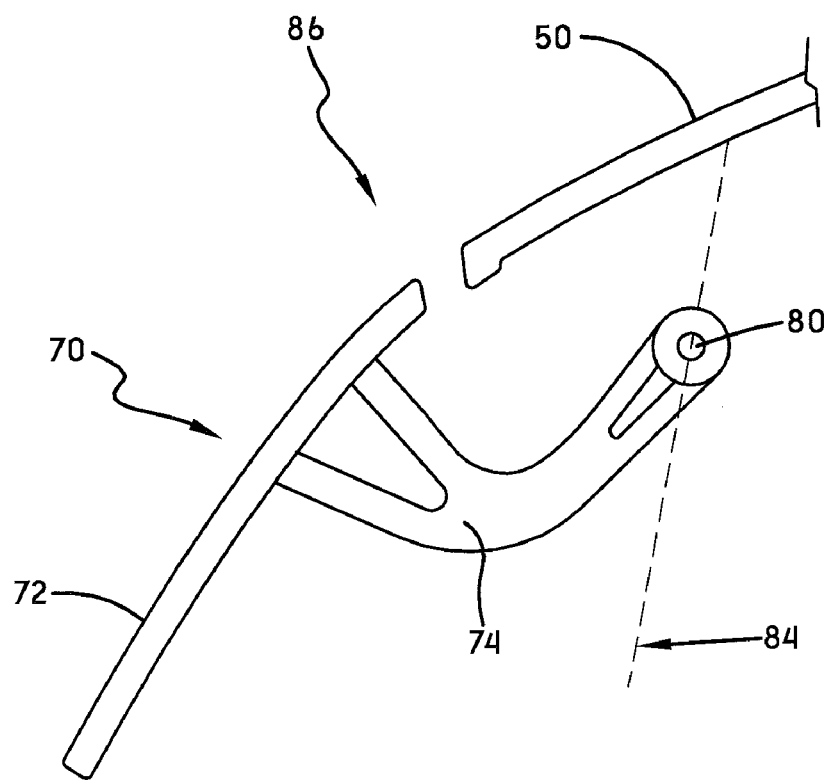
FIG. 9 is a partial perspective side view of an integrated rear spoiler assembly and hinge cover portion in the flush position according to one embodiment of the invention.

With reference now to FIGS. 3-5, 7, 9, the first hinge leaf 24 may comprise a flip-glass receiving portion 23 and a ribbed portion 22. The flip-glass receiving portion 23 may abut the inner surface 16b of the flip-glass window 16. In one embodiment, the upper edge 16a of the flip-glass window 16 may be adjacent to the ribbed portion 22. The flip-glass receiving portion 23 may at least partially allow the respective hinge portion 20a, 20b to be coupled to the flip-glass window 16. In one embodiment, the flip-glass receiving portion 24 may comprise a first aperture 23a that receives a hinge bolt 7, thereby coupling the respective hinge portion 20a, 20b to the flip-glass window 16. Additionally, the flip-glass receiving portion 23 may comprise an adhesive portion 23b that also may at least partially couple the respective hinge portion 20a, 20b to the flip-glass window 16. The flip-glass receiving portion 23 may comprise any means for allowing the flip-glass window 16 to be coupled to the respective hinge portion 20*a*, 20*b* chosen with sound judgment by a person of skill in the art. The ribbed portion 22 may comprise an elevated surface relative to the flip-glass receiving portion 23. The ribbed portion 22 may comprise a hinge cover rib 21. The hinge cover rib 21 may provide an abutting surface for the hinge cover 72, when the hinge cover 72 is in the fully closed position 86 (as shown in FIG. 9) such that an outer surface 72*a* of the hinge cover 72 is flush with or substantially even with the outer surface 50*a* of the main body portion 50 of the rear spoiler assembly 14.

Figure 4A:
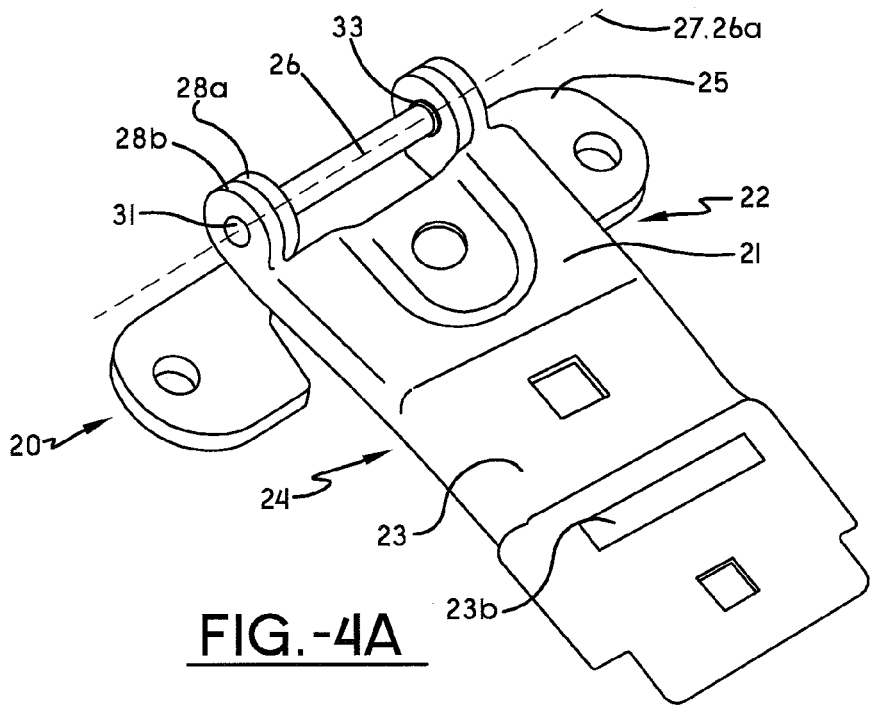
FIG. 4a is a perspective view of a hinge portion and a hinge pin.
Figure 4B:
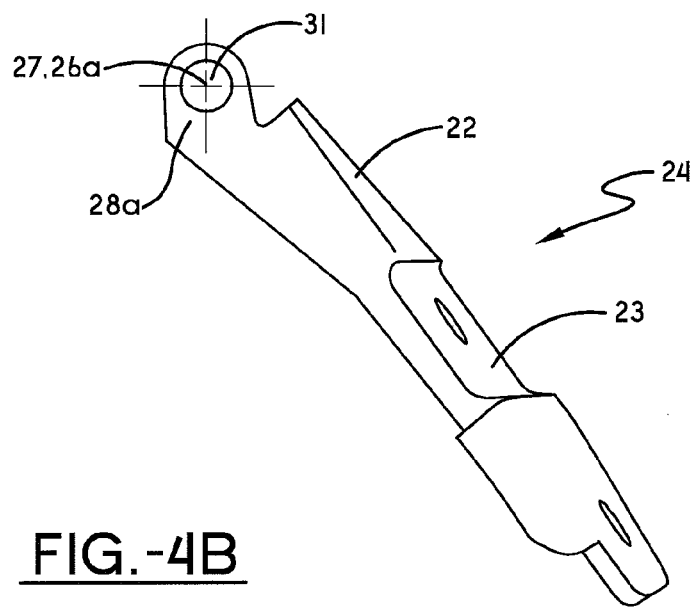
Figure 4C:
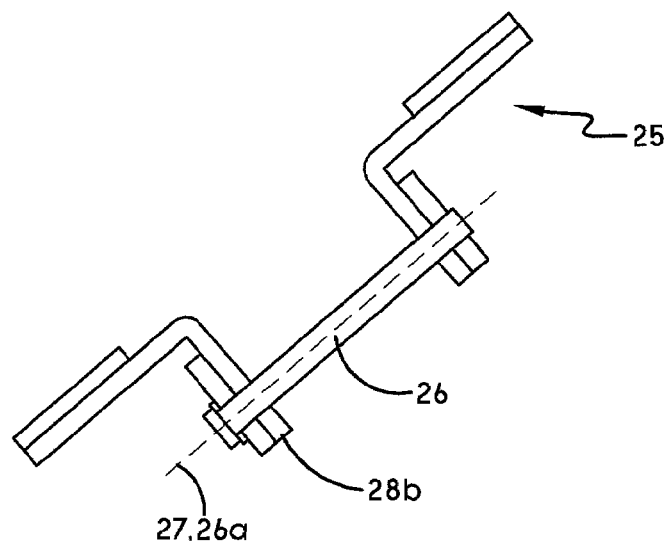
Figure 4D:
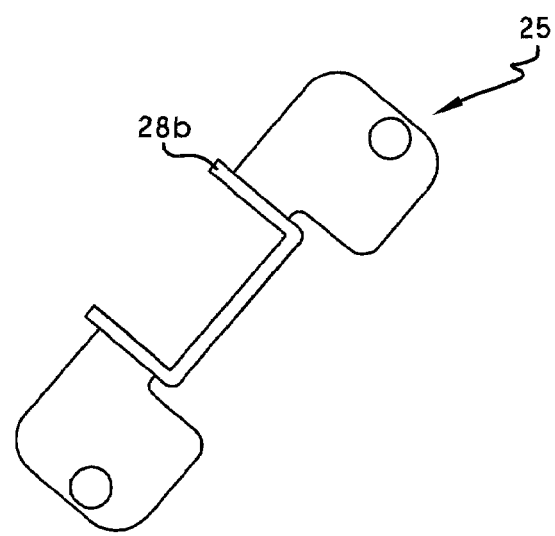
Figure 5:
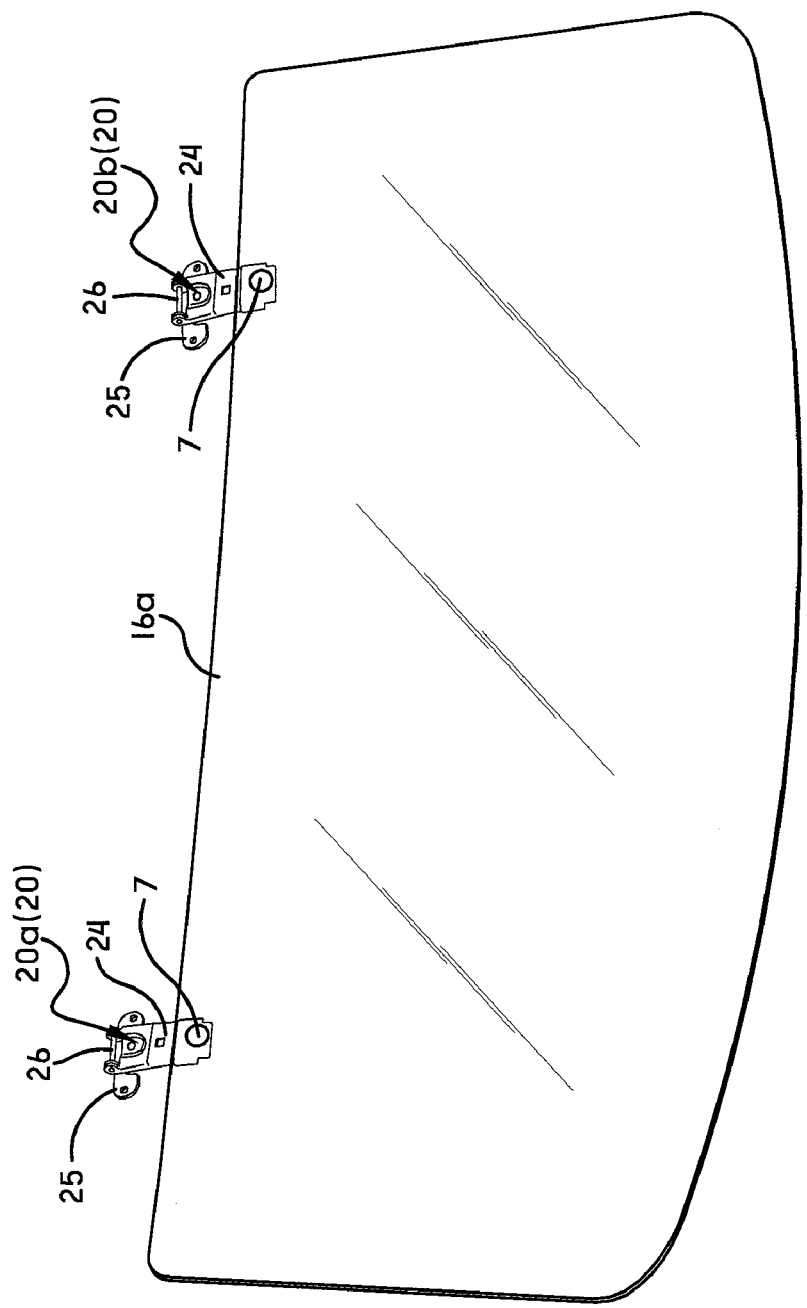
FIG. 5 is a perspective view of a flip-glass window and the hinge portion shown in FIG. 4.

With reference now to FIGS. 4*a*, 4*b*, 4*c*, the first hinge leaf 24 and the hinge mounting portion 25 may each comprise a hinge pin receiver assembly 28*a*, 28*b*. The hinge pin receiver assemblies 28*a*, 28*b* may each comprise a hinge pin aperture 31 and a hinge pin retaining mechanism 33. The hinge pin receiver assemblies 28*a*, 28*b* may interlock or abut such that the hinge pin apertures 31 form a single channel suitable to receive the flip-glass hinge pin 26, which may then be retained by the hinge pin retaining mechanism 33, thereby allowing the first hinge leaf 24 to rotate relative to the hinge mounting portion 25 about the flip-glass hinge axis 27. The rotation of the first hinge leaf 24 relative to the hinge mounting portion 25 may cause the flip-glass window 16 to move from the fully closed position 17 to the fully open position 18.

Figure 6:
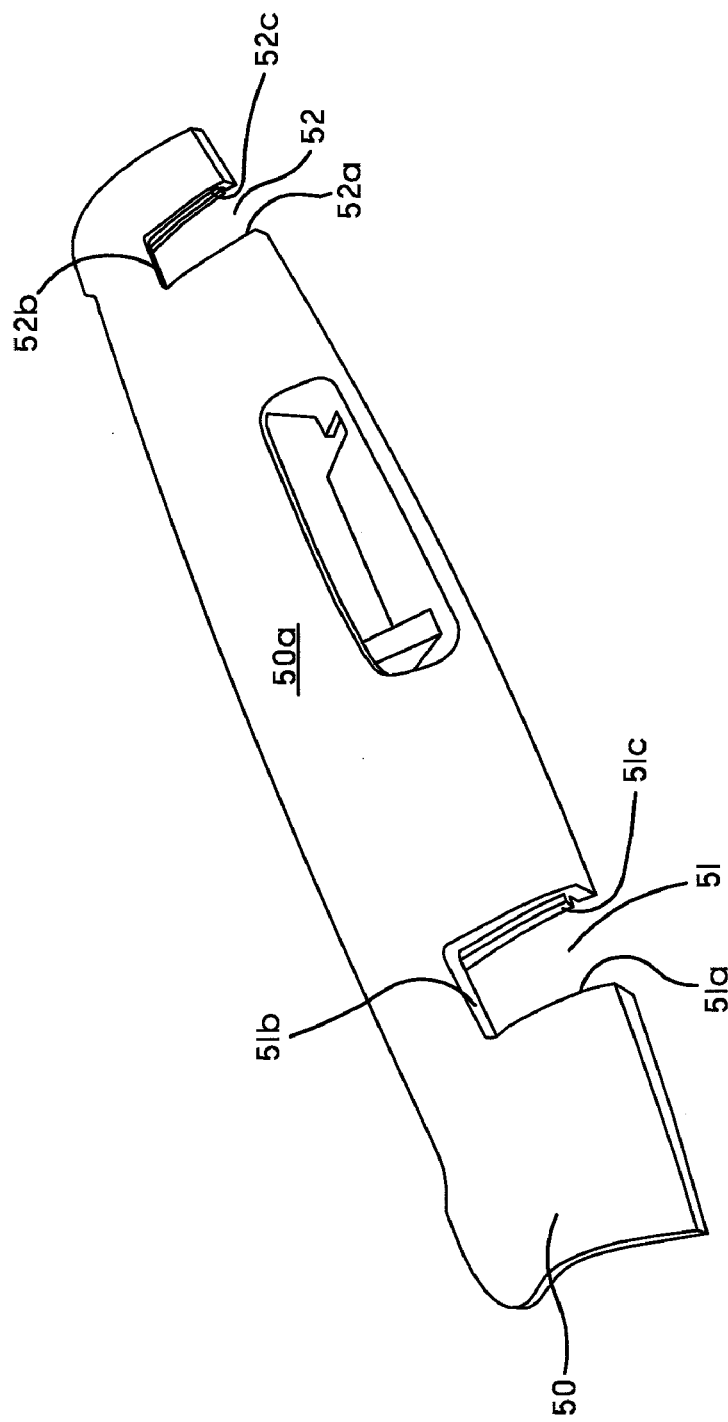
FIG. 6 is a partial perspective view of a rear spoiler assembly main body portion according to one embodiment of the invention.
Figure 7A:
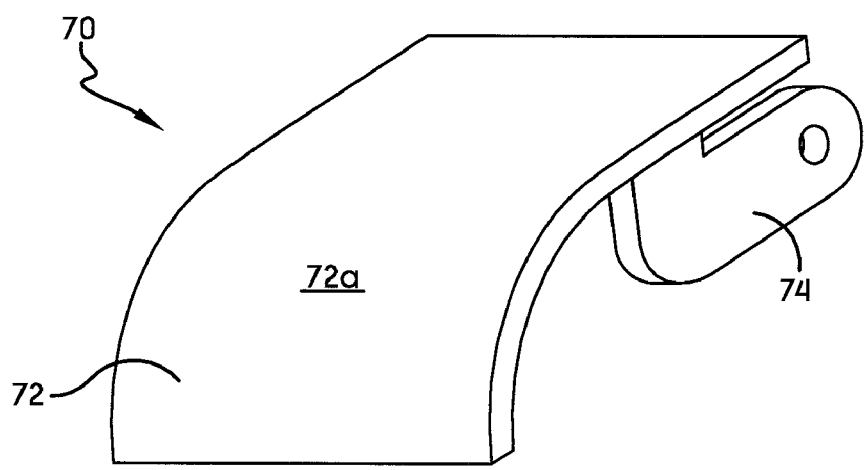
FIG. 7a is a partial assembly view of an integrated rear spoiler assembly and hinge cover portion according to one embodiment of the invention.
Figure 7B:
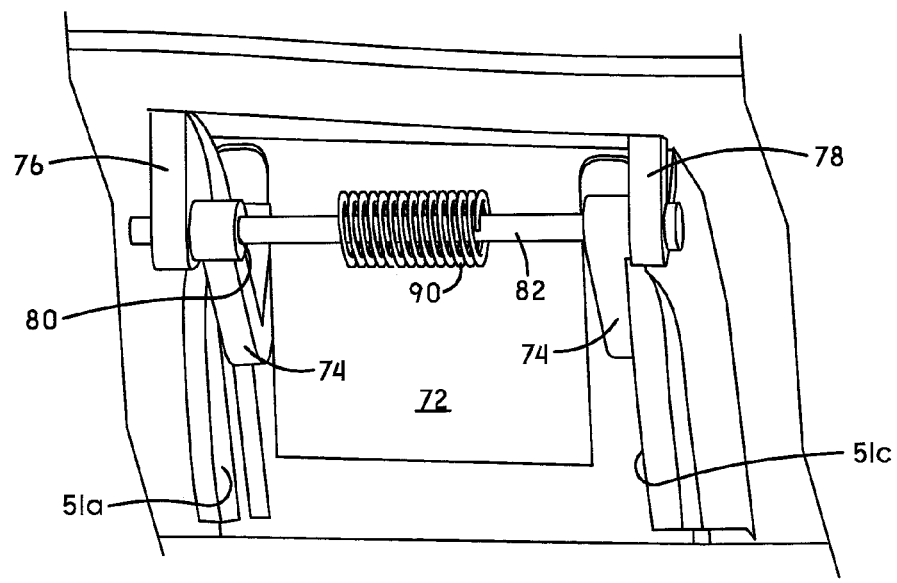

With reference now to FIGS. 1, 6, the rear spoiler assembly 14 may comprise a main body portion 50, a first hinge cover portion 70*a*, and a second hinge cover portion 70*b*. The rear spoiler assembly 14 may comprise any number of hinge cover portions such that each hinge cover portion corresponds with a single hinge portion. In one embodiment, the main body portion 50 may comprise an elongated member that extends substantially completely along the upper edge 16*a* of the flip-glass window 16 (as shown in FIG. 1). The main body portion 50 may extend any distance across the vehicle tailgate 12 chosen with sound engineering judgment. The main body portion 50 may comprise a first hinge cavity 51 and a second hinge cavity 52. The number of hinge cavities may directly correspond to the number of hinge cover portions and the number of hinge portions and can be any number chosen with sound judgment by a person of skill in the art. The first and second hinge cavities 51, 52 may each comprise a recess formed in the main body portion 50 that is defined by a first, a second, and a third cavity wall 51*a-c*, 52*a-c*. In another embodiment, the rear spoiler assembly 14 may comprise a rear light assembly 8. The rear light assembly 8 may comprise a vehicle rear break light assembly for indicating the application of the vehicle's brakes as is well known in the art.

Figure 8:
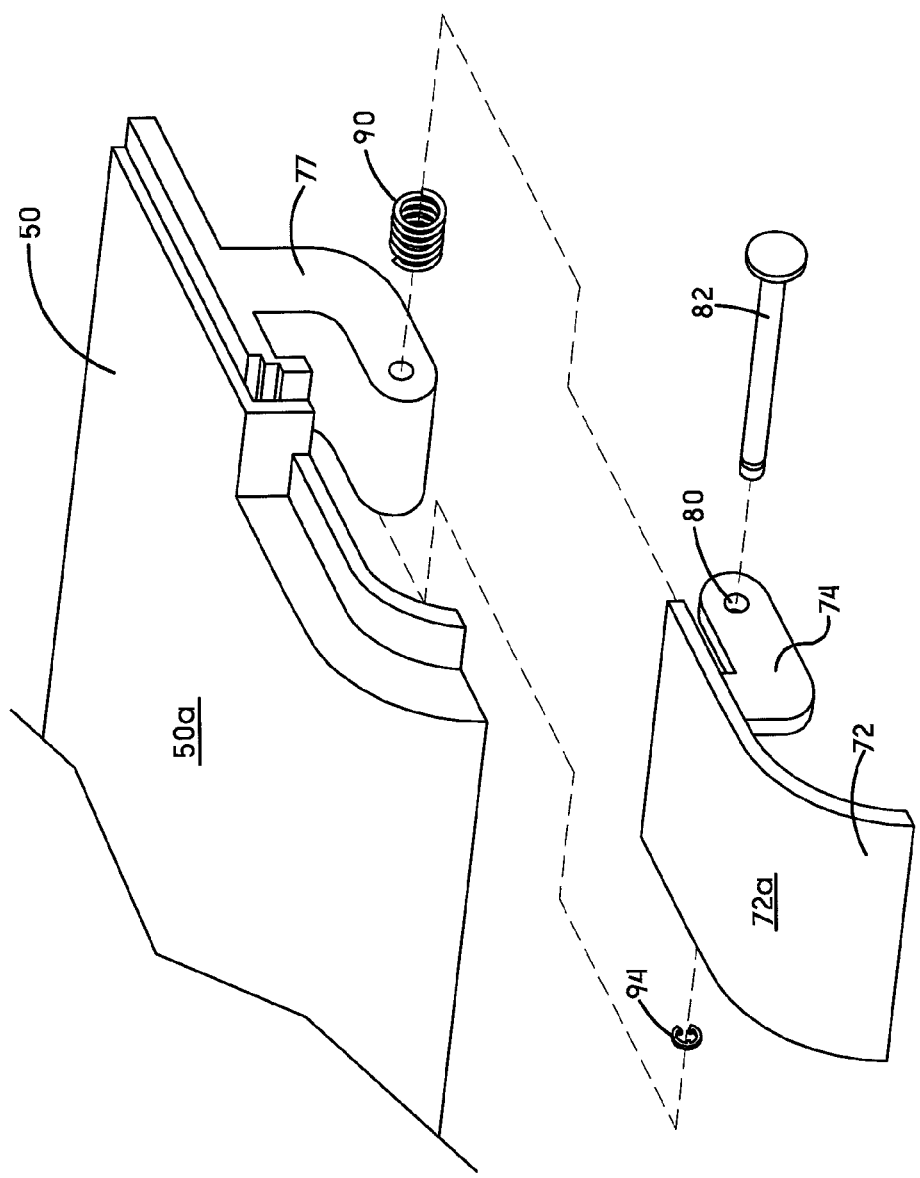
FIG. 8 is a perspective assembly view of a portion of this invention.
Figure 10:
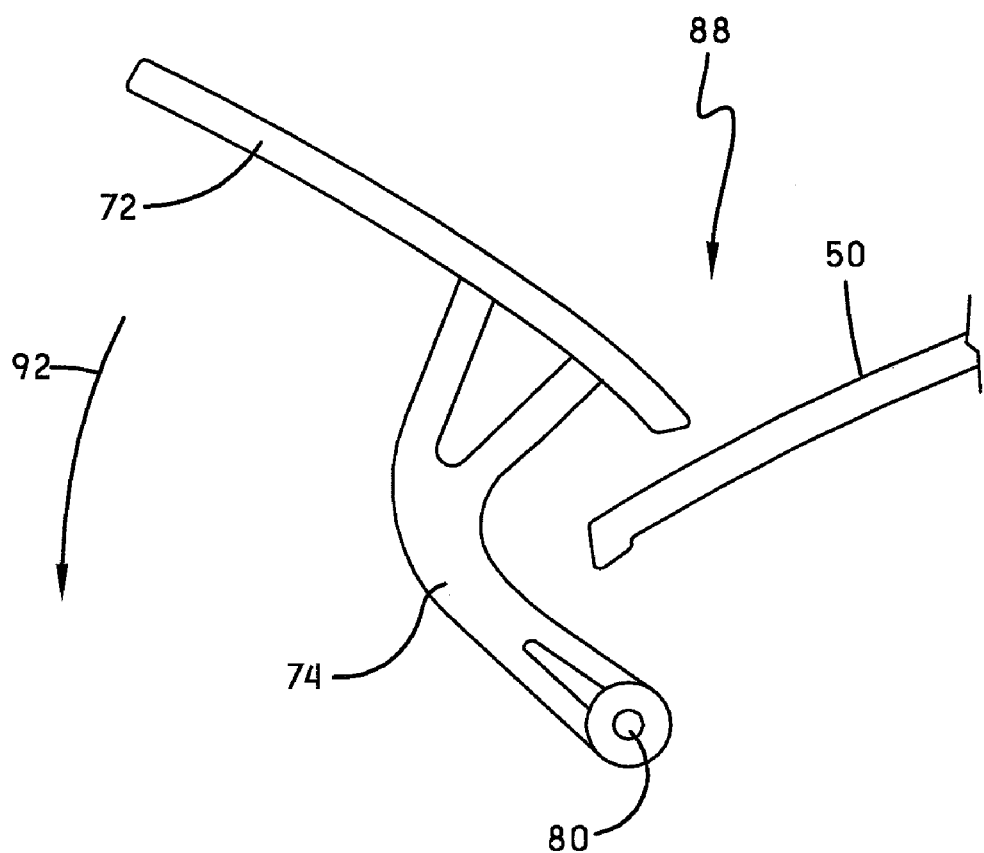
FIG. 10 is a partial perspective side view of an integrated rear spoiler assembly and hinge cover portion in the fully open position according to one embodiment of the invention.
Figure 11:
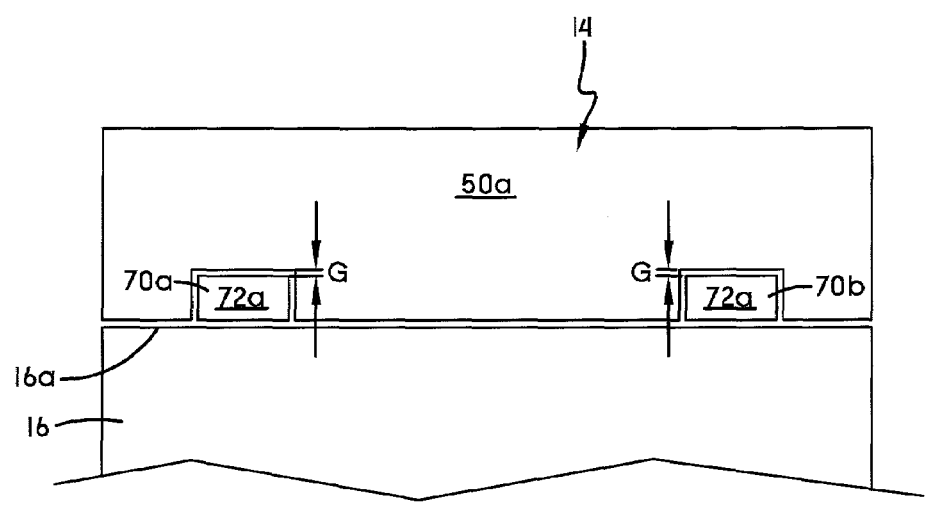
FIG. 11 is a schematic partial view of an integrated rear spoiler assembly and hinge cover portion positioned adjacent to a flip-glass window according to one embodiment of the invention.

With reference now to FIGS. 6-10, the first and second hinge cover portions 70*a*, 70*b* may be substantially similar to each other. For the sake of clarity, only one hinge cover portion, referred to generally as hinge cover portion 70, will be described. The hinge cover portion 70 may comprise a hinge cover 72, a goose-neck tab 74, a first cover tab 76, and a second cover tab 78. The first and second cover tabs 76, 78 may be coupled to opposing cavity walls defining one of the hinge cavities 51, 52 (as shown in FIG. 6) In one embodiment, the first cover tab 76 may be coupled to the first cavity wall 51*a* and the second cover tab 78 may be coupled to the third cavity wall 51*c*. In another embodiment, the first and second cover tabs 76, 78 may comprise a single cover tab 77 that may be formed integrally with the main body portion 50 (as shown in FIG. 8). The hinge cover 72 may be coupled to the goose-neck tab 74. In one embodiment, the hinge cover 72 and the goose-neck tab 74 comprise an integrated component. The goose-neck tab 74 may comprise a curved, substantially U-shaped structure having a first end 74*a* and a second end 74*b*. The hinge cover 72 may abut the first end 74*a* and the second end 74*b* may comprise a hinge pin aperture 80. The hinge pin aperture 80 may allow the hinge cover pin 82 to extend through the hinge pin aperture 80. The hinge cover pin 82 may be received by the first and second cover tabs 76, 78 thereby creating a hinge cover axis 84 and pivotally coupling the hinge cover portion 70 to the main body portion 50. Optionally, the hinge cover pin 82 may comprise a hinge cover pin retaining device 94. The hinge cover pin retaining device 94 may prevent the hinge cover pin 82 from moving away the first and second cover tabs 76, 78. In one embodiment, the hinge cover pin retaining device 94 may comprise a metal fastener comprising a semi-flexible ring with open ends that can be snapped into place into a machined groove on the hinge cover pin 82. The hinge cover pin retaining device 94 may allow the rotation of the hinge cover pin 82 while substantially preventing the lateral movement of the hinge cover pin 82. The hinge cover portion 70 may rotate from a flush position 86 (as shown in FIG. 9) to a fully open position 88 (as shown in FIG. 10) about the hinge cover axis 84. A hinge cover spring 90 may be coupled to the hinge cover pin 82. The hinge cover spring 90 may be biased to provide a biasing force (as shown in FIG. 10 by reference arrow 92) that urges the hinge cover 72 towards the flush position 86.

With reference now to FIGS. 1-2, 4*a*-4*d*, 9 and 11, in the flush position 86, the hinge cover 72 may substantially cover the hinge mounting portion 25, the flip-glass hinge pin 26, and the ribbed portion 22. In another embodiment, in the flush position, the hinge cover 72 may substantially cover the hinge mounting portion 25, the flip-glass hinge pin 26, the ribbed portion 22, and at least a portion of the flip-glass receiving portion 23. Rotation of the flip-glass window 16 about the flip-glass window hinge axis 27 from the fully closed position 17 to the fully open position 18 may cause the first hinge leaf 24 to contact the hinge cover 72 thereby causing the hinge cover 72 to substantially simultaneously rotate about the hinge cover axis 84. In one embodiment, rotation of the flip-glass window 16 about the flip-glass window hinge axis 27 from the fully closed position 17 to the fully open position 18 may cause the ribbed portion 22 to contact the hinge cover 72 thereby causing the hinge cover 72 to substantially simultaneously rotate about the hinge cover axis 84. The hinge cover spring 90 may urge the hinge cover 72 from the fully open position 88 to the fully closed position 86 when the flip-glass window 16 is rotated about the flip-glass window hinge axis 27 from the fully open position 18 to the fully closed position 17.

Figure 12:
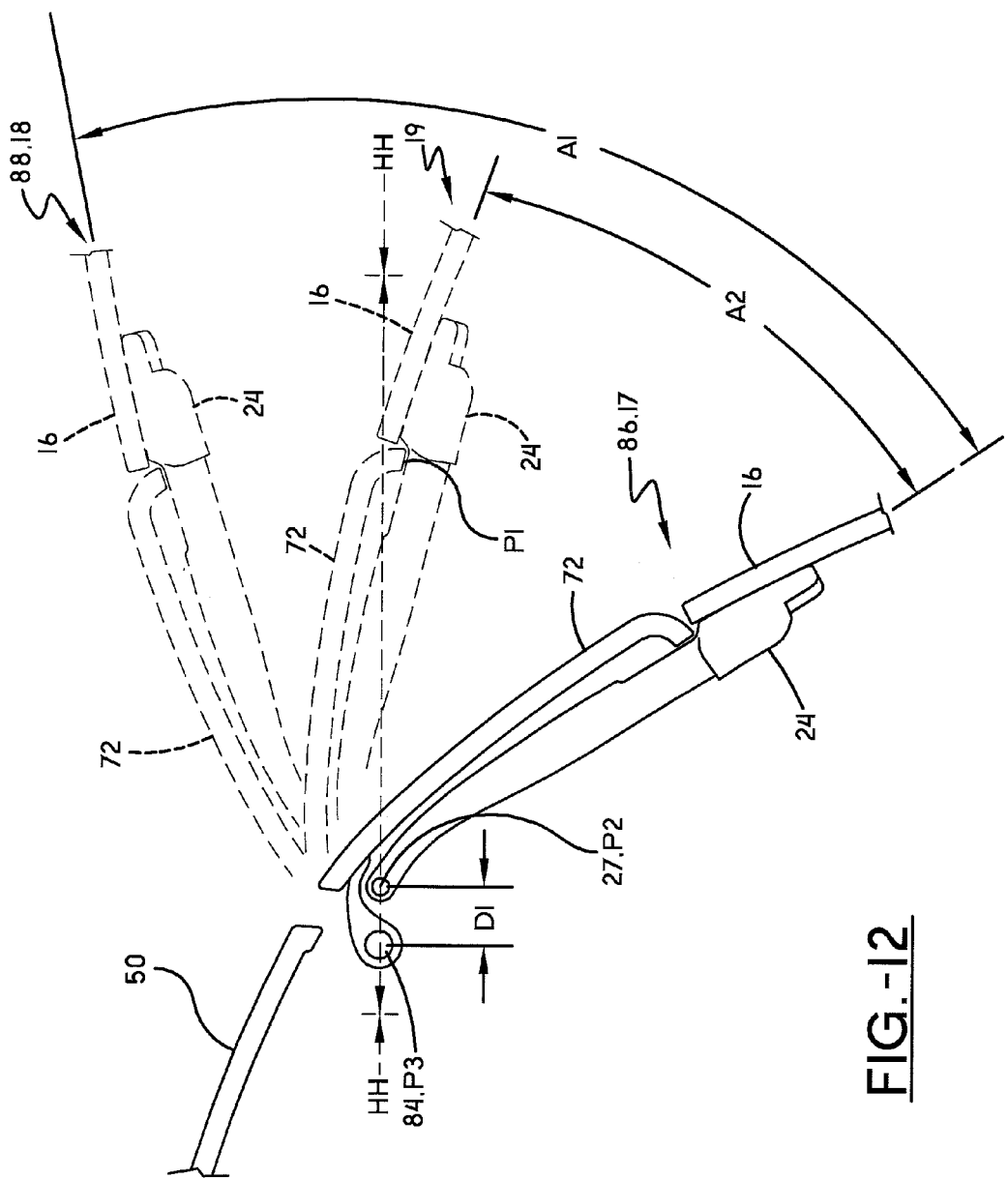
FIG. 12 is a perspective view of the integrated rear spoiler assembly and hinge cover portion showing various positions of the hinge portion coupled to the flip-glass window as it moves between a flush or fully closed position, a H-position, and a fully open position according to one embodiment of the invention.

With reference now to FIGS. 9, 12, the position of the hinge cover axis 84 relative to the flip-glass hinge axis 27 will be described. The flip-glass window 16 may rotate a first angular distance A1 about the flip-glass hinge axis 27 in moving from the fully closed position 17 to the fully open position 18. The first angular distance A1 may comprise any angular distance chosen with sound judgment by a person of ordinary skill in the art. The flip-glass window 16 may rotate a second angular distance A2 about the flip-glass hinge axis 27 in moving from the fully closed position 17 to an H-position 19. The H-position 19 may comprise a position that is between the fully closed position 17 and the fully open position 18. The second angular distance A2 may be substantially equal to one-half (½) of the first angular distance A1. In the H-position 19, the bottom edge 72*c* of the hinge cover 72 may be located at a first point P1. In one embodiment, the hinge cover axis 84 may be substantially perpendicular to and positioned along a reference line HH that extends through the first point P1 and the flip-glass hinge axis 27. In another embodiment, the hinge cover axis 84 may be substantially perpendicular to and positioned below the reference line HH. The flip-glass hinge axis 27 may be located at a second point P2 along the reference line HH. The hinge cover axis 84 may be located at a third point P3 along the reference line HH. The second point P2 and the third point P3 may be separated by a first distance D1 along the reference line HH. The first distance D1 may be directly related to the gap G between the main body portion 50 and the hinge cover 72 when the hinge cover portion 70 is in the fully closed position 86. The first distance D1 may be any distance chosen with sound judgment. The first distance D1 may be chosen to provide a specific aesthetic appearance to the rear spoiler assembly 14.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

We claim:

1. A vehicle rear-facing side comprising:
    a rear-facing side body;
    a flip-glass window that is pivotally coupled to the rear-facing side body via a flip-glass window hinge thereby creating a flip-glass axis, such that the flip-glass window can rotate between a fully closed position and a fully opened position along the flip-glass axis;
    a rear spoiler assembly comprising:
        a main body portion coupled to the rear-facing side body comprising a hinge cover recess, wherein the hinge cover recess is defined by a first recess wall, a second recess wall, and a third recess wall;
        a hinge cover portion comprising:
            a hinge cover;
            a goose neck tab coupled to the hinge cover;
            a first and a second cover tab, wherein the first cover tab is coupled to the first recess wall and the second cover tab is coupled to the third recess wall and the first recess wall is substantially directly opposite of the third recess wall; and,
            a hinge cover pin, wherein the hinge cover pin pivotally couples the hinge cover portion to the main body portion thereby creating a hinge cover axis such that the hinge cover can rotate between a fully closed position and a fully open position about the hinge cover axis;
    wherein rotation of the flip-glass window from the fully closed position to the fully open position causes the hinge cover to substantially simultaneously rotate from the fully closed position to the fully open position.

2. The vehicle rear-facing side of claim 1, wherein the hinge cover portion further comprises:
    a cover spring, wherein the cover spring is coupled to the hinge cover pin and urges the hinge cover towards the fully closed position.

3. The vehicle rear-facing side of claim 1, wherein the flip-glass window rotates a first angular distance between the fully closed position and the fully open position,
    wherein the flip-glass window rotates a second angular distance between the fully closed position and a H-position, wherein the second angular distance is equal to about one half of the first angular distance and the hinge cover axis is located along a first reference line that extends through the flip glass hinge axis and the H-position.

4. The vehicle rear-facing side of claim 1, wherein the flip-glass window rotates a first angular distance between the fully closed position and the fully open position,
    wherein the flip-glass window rotates a second angular distance between the fully closed position and a H-position, wherein the second angular distance is equal to about one half of the first angular distance and the hinge cover axis is located below a first reference line that extends through the flip glass hinge axis and the H-position.

5. The vehicle rear-facing side of claim 1, wherein the flip-glass window hinge comprises:
    a first hinge leaf coupled to an inner surface of the flip-glass window;
    a second hinge leaf coupled to an outer surface of the rear-facing side body; and,
    a flip-glass hinge pin, wherein the hinge cover substantially covers the second hinge leaf and the flip-glass hinge pin.

6. The vehicle rear-facing side of claim 1, wherein the flip-glass window hinge comprises:
    a first hinge leaf coupled to an inner surface of the flip-glass window;
    a second hinge leaf coupled to an outer surface of the rear-facing side body; and,
    a flip-glass hinge pin, wherein the hinge cover substantially covers the second hinge leaf, the flip-glass hinge pin, and at least a portion of the first hinge leaf.

7. A vehicle comprising:
    a vehicle rear-facing side;
    a flip-glass window that is pivotally coupled to the vehicle rear-facing side via a flip-glass window hinge thereby creating a flip-glass axis, such that the flip glass window can rotate between a fully closed position and a fully opened position along the flip-glass axis;
    a rear spoiler assembly coupled to the vehicle rear-facing side comprising:
        a main body portion comprising a hinge cover recess, wherein the hinge cover recess is defined by a first recess wall, a second recess wall, and a third recess wall;
        a hinge cover portion comprising:
            a hinge cover;
            a goose neck tab coupled to the hinge cover;
            a first and a second cover tab, wherein the first cover tab is coupled to the first recess wall and the second cover tab is coupled to the third recess wall and the first recess wall is substantially directly opposite of the third recess wall; and,
            a hinge cover pin, wherein the hinge cover pin pivotally couples the hinge cover portion to the main body portion thereby creating a hinge cover axis such that the hinge cover can rotate between a fully closed position and a fully open position about the hinge cover axis;
    wherein rotation of the flip-glass window from the fully closed position to the fully open position causes the hinge cover to substantially simultaneously rotate from the fully closed position to the fully open position.

8. The vehicle of claim 7, wherein the hinge cover portion further comprises:
    a cover spring, wherein the cover spring is coupled to the hinge cover pin and urges the hinge cover towards the fully closed position.

9. The vehicle of claim 7, wherein the flip-glass window rotates a first angular distance between the fully closed position and the fully open position, wherein the flip-glass window rotates a second angular distance between the fully closed position and a H-position, wherein the second angular distance is equal to about one half of the first angular distance and the hinge cover axis is located along a first reference line that extends through the flip-glass hinge axis and the H-position, and, the hinge cover axis and the flip-glass hinge axis are separated along the first reference line by a first distance.

10. The vehicle of claim 7, wherein the flip-glass window rotates a first angular distance between the fully closed position and the fully open position, wherein the flip-glass window rotates a second angular distance between the fully closed position and a H-position, wherein the second angular distance is equal to about one half of the first angular distance and the hinge cover axis is located below a first reference line that extends through the flip-glass hinge axis and the H-position.

11. The vehicle of claim 7, wherein the flip-glass window hinge comprises:
a first hinge leaf coupled to an inner surface of the flip-glass window;
a second hinge leaf coupled to an outer surface of the vehicle rear-facing side; and,
a flip-glass hinge pin, wherein the hinge cover substantially covers the second hinge leaf and the flip-glass hinge pin.

12. The vehicle of claim 7, wherein the flip-glass window hinge comprises:
a first hinge leaf coupled to an inner surface of the flip-glass window;
a second hinge leaf coupled to an outer surface of the vehicle rear-facing side; and,
a flip-glass hinge pin, wherein the hinge cover substantially covers the second hinge leaf, the flip-glass hinge pin, and at least a portion of the first hinge leaf.

13. A method comprising the steps of:
(a) providing a vehicle comprising a vehicle rear-facing side; a flip-glass window that is pivotally coupled to the vehicle rear-facing side via a flip-glass window hinge thereby creating a flip-glass axis, such that the flip glass window can rotate between a fully closed position and a fully opened position along the flip-glass axis wherein an H-position is located substantially about one half of the angular distance between the fully closed position and the fully open position; a vehicle air deflector assembly coupled to the vehicle rear-facing side comprising: a main body portion comprising a hinge cover recess, wherein the hinge cover recess is defined by a first recess wall, a second recess wall, and a third recess wall; a hinge cover portion comprising: a hinge cover; a goose neck tab coupled to the hinge cover; a first and a second cover tab, wherein the first cover tab is coupled to the first recess wall and the second cover tab is coupled to the third recess wall and the first recess wall is substantially directly opposite of the third recess wall; and, a hinge cover pin, wherein the hinge cover pin pivotally couples the hinge cover portion to the main body portion thereby creating a hinge cover axis such that the hinge cover can rotate between a fully closed position and a fully open position about the hinge cover axis; wherein rotation of the flip-glass window from the fully closed position to the fully open position causes the hinge cover to substantially simultaneously rotate from the fully closed position to the fully open position;
(b) rotating the flip-glass window from the fully closed position to the fully open position, wherein the rotation of the flip-glass window from the fully closed position to the fully open position at least partially causes the integrated hinge cover to rotate from a flush position to an open position.

14. The method of claim 13, wherein step (a) further comprises the step of:
positioning the hinge cover axis substantially along a first reference line wherein the first reference line extends through the H-position and the flip-glass axis, wherein the hinge cover axis and the flip-glass axis are separated by a first distance.

15. The method of claim 13, wherein step (a) further comprises the step of:
positioning the hinge cover axis substantially below a first reference line, wherein the first reference line extends through the H-position and the flip-glass axis.

* * * * *